United States Patent [19]

Ota et al.

[11] 4,340,644
[45] Jul. 20, 1982

[54] MAGNETIC RECORDING MEDIUM

[75] Inventors: Hiroshi Ota, Komoro; Eiji Horigome, Saku; Hitoshi Azegami, Tobu, all of Japan

[73] Assignee: TDK Electronics Co., Ltd., Tokyo, Japan

[21] Appl. No.: 95,647

[22] Filed: Nov. 19, 1979

[30] Foreign Application Priority Data

Nov. 24, 1978 [JP] Japan .............................. 53-144285

[51] Int. Cl.³ .............................................. G11B 5/68
[52] U.S. Cl. ........................... 428/423.7; 252/62.54; 360/134; 427/128; 428/425.9; 428/483; 428/522; 428/694; 428/900
[58] Field of Search .............. 428/400, 423.7, 425.9, 428/522, 694, 695, 483; 360/134, 135, 136; 252/62.54; 427/128

[56] References Cited

U.S. PATENT DOCUMENTS

| | | | |
|---|---|---|---|
| 3,049,442 | 8/1962 | Haines et al. | 427/128 |
| 3,149,995 | 9/1964 | Bauer | 428/900 |
| 3,460,984 | 8/1969 | Bisschops et al. | 427/128 |
| 3,983,302 | 9/1976 | Zucker | 428/900 |
| 4,068,040 | 1/1978 | Yamada et al. | 427/128 |
| 4,115,290 | 4/1978 | Kubota et al. | 252/62.54 |
| 4,234,438 | 11/1980 | Horigome et al. | 252/62.54 |

FOREIGN PATENT DOCUMENTS

| | | | |
|---|---|---|---|
| 52-8807 | of 1977 | Japan | 428/900 |
| 1102968 | 2/1968 | United Kingdom | 252/62.54 |

Primary Examiner—Stanley S. Silverman
Attorney, Agent, or Firm—Wyatt, Gerber, Shoup, Scobey & Badie

[57] ABSTRACT

A magnetic recording medium consisting of a base coated with magnetic coating material which is a dispersion of magnetic particles using a vinyl chloride-vinyl acetate copolymer and a polyester resin as binder, characterized by the addition of a vinyl chloride-vinyl acetate copolymer containing at least 10% of vinyl alcohol. The use of the last-mentioned copolymer improves the frequency response characteristic as well as the mechanical properties such as the running quality.

4 Claims, 2 Drawing Figures

MAGNETIC RECORDING MEDIUM

BACKGROUND OF THE INVENTION

This invention relates to a magnetic recording medium, and more specifically to a magnetic recording medium with desirable running quality and frequency response characteristic.

In general, the magnetic recording medium is made by coating polyester film or other base with a magnetic coating material which consists of powdered $\gamma\text{-Fe}_2\text{O}_3$ or the like dispersed in a macromolecular resin binder. The nature of the magnetic coating used has important bearings not only upon the running quality and other physical properties but also upon the magnetic characteristic of the medium that is related to the dispersibility of the magnetic particles and other factors, and this nature largely depends on the binding and addition agents chosen. Also, the physical and electromagnetic properties of the medium are closely interrelated. With these in view, a variety of binders for magnetic coating materials have hitherto been introduced, but none have proved fully satisfactory.

The binders thus far employed have been urethanes, vinyl chloride-vinyl acetate copolymers, cellulose plastics, epoxy resins, and polyesters, mostly in combinations of two different resins. The present invention is concerned with improvements in magnetic recording media which use, out of the above-mentioned resins, the vinyl chloride-vinyl acetate copolymers and polyester resins.

The magnetic recording medium whose coating contains a vinyl chloride-vinyl acetate copolymer containing less than 8% vinyl alcohol and a polyester resin as mixed binder gives excellent results in respect of running quality, that is, its ability of being ideally drawn past the magnetic head in a cassette tape deck, particularly in the hot and humid environment (e.g., at 60° C. and 75% RH). It has, however, failed to be quite satisfactory in frequency response characteristic and amelioration in this point has been called for.

BRIEF SUMMARY OF THE INVENTION

Accordingly, a primary object of the present invention is to provide a magnetic recording medium which overcomes the above difficulties.

Further object of the invention is to provide a magnetic recording medium of the just mentioned type, wherein the coating is improved by adding to said binder a vinyl chloride-vinyl acetate compolymer containing at least 10% vinyl alcohol therein as its structural unit.

The use of vinyl chloride-vinyl acetate copolymer having vinyl alcohol therein has been found to improve the frequency response while retaining the superior running quality of a magnetic tape produced by using a binder composition essentially consisting of vinyl chloride-vinyl acetate copolymer containing less than 8% vinyl alcohol and polyester resin.

The present invention will be fully described in the following, making reference to the working examples and the accompanying drawing.

DETAILED DESCRIPTION OF THE INVENTION

Figure 1:
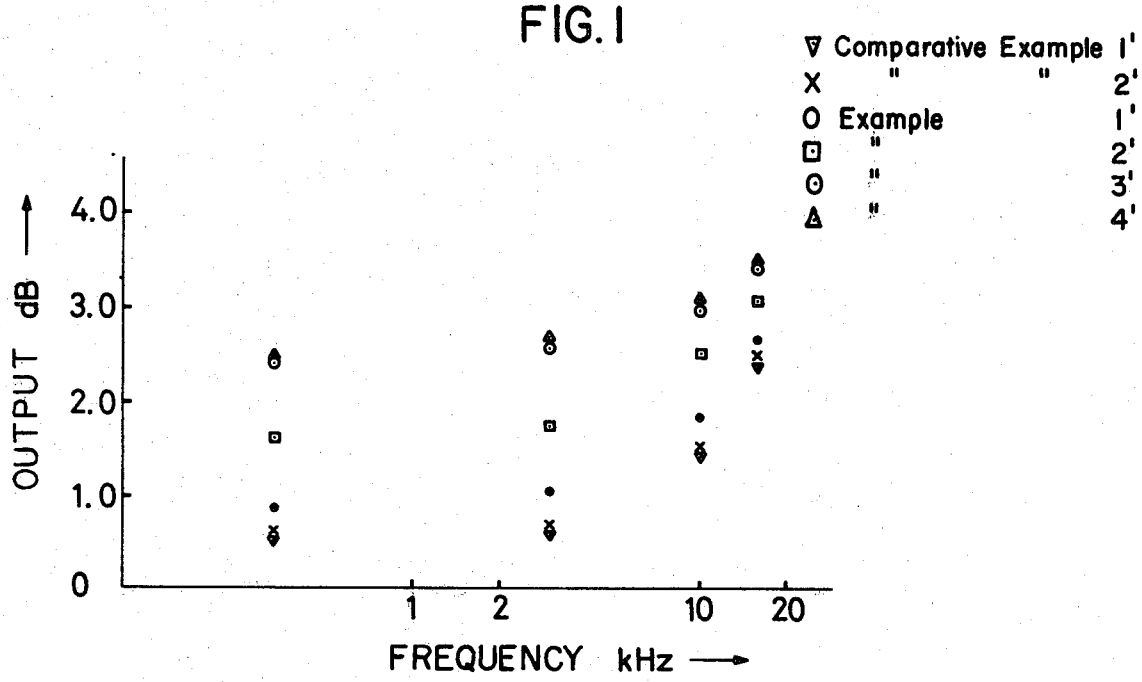
FIG. 1 is a graph showing the frequency response characteristics of samples of magnetic recording medium made in Examples of the invention and in Comparative Examples.

After extensive researches, the frequency response characteristic has now been markedly improved in accordance with the present invention by using a vinyl chloride-vinyl acetate copolymer containing at least 10% of vinyl alcohol together with a binary binder consisting essentially of vinyl chloridevinyl acetate copolymer containing less than 8% of vinyl alcohol and polyester resin. Vinyl alcohol,

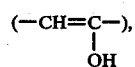

will not prove adequately effective unless it is contained in the vinyl alcohol-containing copolymer in an amount of at least 10% by weight on the basis of the vinyl chloride-vinyl acetate copolymer containing less than 8% of vinyl alcohol. The copolymer, in turn, must not exceed 50% of the total weight of the binder and preferably 40%, because such an excessive copolymer will rather promote the gelation of the magnetic coating material. With the at least 10% vinyl containing-copolymer below 40%, the gelation of the magnetic coating material will scarcely proceed. It has thus been found that strict control of the content of the copolymer is not essential for the preparation of the magnetic coating material so long as the at least 10% vinyl alcohol-containing copolymer is contained in an amount of 50% or less, preferably 40% or less.

According to this invention, advantages of good running quality and desirable electromagnetic properties in hot and humid environments are conferred on the magnetic recording medium.

Next, Examples of this invention will be explained and discussed in relation to Comparative Examples. In each Example that follows, only the resin composition to serve as binder is shown. These compositions were used in combination with the composition A mentioned last.

| Example 1 | |
|---|---|
| Vinyl chloride-vinyl acetate copolymer (marketed under the trade designation "VAGH" by Union Carbide Corp.) | 17 parts by weight |
| Polyester resin ("Desmophen 2200" by Sumitomo Bayer Urethane) | 13 parts by weight |
| Vinyl chloride-vinyl acetate copolymer ("OH-DEX" by Denki Kagaku Kogyo) (contg. over 10% vinyl alcohol) | 3 parts by weight |
| Example 2 | |
| Vinyl chloride-vinyl acetate copolymer ("VAGH" by UCC) | 13 parts by weight |
| Polyester resin ("Nippollan 143" by Nippon Polyurethane Ind.) | 13 parts by weight |

-continued

| | |
|---|---|
| Vinyl chloride-vinyl acetate copolymer ("OH-DEX" by Denki Kagaku Kogyo) (contg. over 10% vinyl alcohol) | 7 parts by weight |
| Example 3 | |
| Vinyl chloride-vinyl acetate copolymer ("VAGH" by UCC) | 10 parts by weight |
| Polyester resin ("Desmophen 1800" by Sumitomo Bayer Urethane) | 13 parts by weight |
| Vinyl chloride-vinyl acetate copolymer ("OH-DEX" by Denki Kagaku Kogyo) (contg. over 10% vinyl alcohol) | 10 parts by weight |
| Example 4 | |
| Vinyl chloride-vinyl acetate copolymer ("VAGH" by UCC) | 7 parts by weight |
| Polyester resin (Desmophen 1100" by Sumitomo Bayer Urethane) | 13 parts by weight |
| Vinyl chloride-vinyl acetate copolymer ("OH-DEX" by Denki Kagaku Kogyo) (contg. over 10% vinyl alcohol) | 17 parts by weight |
| Comparative Example 1 | |
| Vinyl chloride-vinyl acetate copolymer ("VAGH" by UCC) | 20 parts by weight |
| Polyester resin ("Nippollan 4032" by Nippon Polyurethane Ind.) | 13 parts by weight |
| Comparative Example 2 | |
| Vinyl chloride-vinyl acetate copolymer ("VAGH" by UCC) | 20 parts by weight |
| Polyester resin ("Desmophen 1800" by Sumitomo Bayer Urethane) | 13 parts by weight |
| Composition A | |
| $\gamma$-$Fe_2O_3$ powder (cobalt-doped) | 100 parts by weight |
| Lubricant | 5 parts by weight |
| Methyl ethyl ketone | 100 parts by weight |
| Methyl isobutyl ketone | 100 parts by weight |
| Toluene | 100 parts by weight |

Each composition of Comparative Examples 1, 2 and Examples 1 to 4 was thoroughly mixed for dispersion with the composition A in a ball mill and, after the addition of 5 parts by weight of a polyfunctional aromatic isocyanate ("Desmodur L" marketed by Sumitomo Bayer Urethane Co.), the mixture was agitated for uniform dispersion. The resultant was applied on a backing material, or a 12 $\mu$-thick polyester base, to form a coating layer thereon which would be 6$\mu$ thick when dried solid. Following a surface processing, the coated material was hardened by a heat treatment at 60° C. for 48 hours, and then was cut to a predetermined size as a magnetic tape. The frequency response characteristic of each test tape thus obtained was determined. The results are plotted in FIG. 1, in which, for example, the test tape made in Comparative Example 1 is indicated as Comp. Ex. 1' and so forth.

Figure 2:
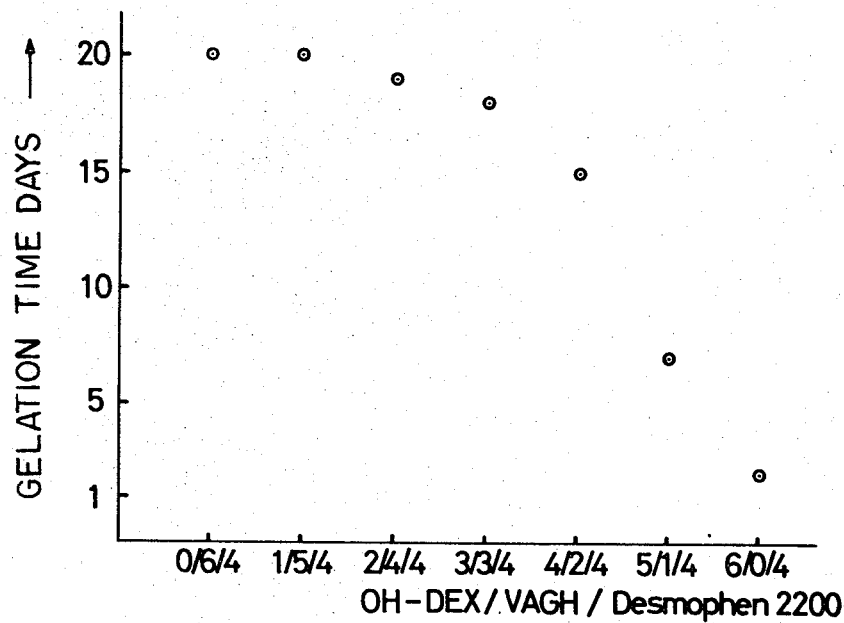
FIG. 2 is a graph showing the relationship between the contents of at least 10% vinyl alcohol-containing vinyl chloride-vinyl acetate copolymer used in accordance with the invention and the periods of gelation time required.

FIG. 2 shows the numbers of days required for gelation by compositions consisting of a vinyl chloride-vinyl acetate copolymer, containing 6% of vinyl alcohol marketed as VAGH by Union Carbide Corp. a polyester resin, and a vinyl chloride-vinyl acetate copolymer (containing over 10% vinyl alcohol) in varied proportions, after each composition has been mixed with the composition A freed of the $\gamma$-$Fe_2O_3$ powder, placed into a sampling tube, mixed with a polyfunctional aromatic isocyanate ("Desmodur L" marketed by Sumitomo Bayer Urethane Co.), hermetically sealed therein by a stopper, and kept at 20° C.

As can be seen from FIG. 1, the samples of magnetic recording medium (Comp. Ex. 1', 2') made by using the compositions of Comparative Examples 1, 2, or the conventional binary binder of a vinyl chloride-vinyl acetate copolymer containing 6% vinyl alcohol and a polyester resin, which does not include a vinyl chloride-vinyl acetate copolymer containing at least 10% vinyl alcohol, do not exhibit good frequency response characteristic. In contrast to them, the samples of magnetic recording medium (Examples 1'-4') made by using the compositions of Examples 1-4, or the ternary binder including the more than 10% containing vinyl alcohol-containing vinyl chloride-vinyl acetate copolymer, show improvements in frequency response over the conventional samples by about 0.5 to 2 dB, the response being satisfactory over the entire range of frequencies encountered. Example 1 provides a sample in which the vinyl alcohol content (on the basis of the total amount of the binder) is relatively small, and Example 4 provides a sample having a relatively large content, with a corresponding improvement in frequency response characteristic.

According to the data on gelation time in FIG. 2, the number of days required for gelation changes little until the vinyl chloride-vinyl acetate copolymer containing more than 10% vinyl alcohol accounts for about 40% by weight of the ternary binder but decreases appreciably as the vinyl alcohol-containing copolymer proportion exceeds 50% by weight. From this the vinyl alcohol-containing copolymer content of 50% appears to be practically the upper limit.

Examples 1-4 and Comparative Examples 1-2 gave products which all exhibited excellent running quality under high temperature, high humidity (60° C. and 75% RH) conditions.

From the foregoing description it is clear that the magnetic recording medium according to the invention has good electromagnetic properties in addition to outstanding running quality.

What we claimed is:

1. A magnetic recording medium of improved frequency response and running quality comprising a base coated with a magnetic coating material which is a dispersion of magnetic particles in a three resin component binder containing a vinyl chloride-vinyl acetate copolymer resin, a polyester resin together with an amount which is effective to achieve such improvements of up to 50% by weight based on the total weight of the binder of a vinyl alcohol-vinyl chloride-vinyl acetate copolymer resin containing at least 10% vinyl alcohol monomer, and a polyfunctional aromatic isocyanate curing agent.

2. A magnetic recording medium according to claim 1, in which the proportion of said vinyl chloride-vinyl acetate copolymer containing vinyl alcohol is about 40% or less by weight of the total weight of said binder.

3. A magnetic recording medium according to claim 1 or 3 in which said base is in the form of a tape.

4. A magnetic recording medium according to claim 3, in which the tape is formed of a polyester film.

* * * * *